(12) United States Patent
Müller

(10) Patent No.: US 6,631,664 B2
(45) Date of Patent: Oct. 14, 2003

(54) SLITTING SHEARS

(76) Inventor: Ingolf Müller, 57462 Olpe, Mesterfeld 6 (DE)

( * ) Notice: Subject to any disclaimer, the term of this patent is extended or adjusted under 35 U.S.C. 154(b) by 0 days.

(21) Appl. No.: 09/902,530

(22) Filed: Jul. 10, 2001

(65) Prior Publication Data

US 2003/0010172 A1 Jan. 16, 2003

(30) Foreign Application Priority Data

Jul. 17, 2000 (DE) .......................... 100 34 719

(51) Int. Cl.⁷ .................... B26D 1/24; B23D 19/04
(52) U.S. Cl. ................ 83/501; 83/499; 83/504
(58) Field of Search .................. 83/498, 499, 504, 83/508.2, 508.3, 501

(56) References Cited

U.S. PATENT DOCUMENTS

| | | | | | |
|---|---|---|---|---|---|
| 3,854,361 A | * | 12/1974 | Kercher et al. | ................ | 83/499 |
| 3,877,335 A | * | 4/1975 | Lange | ................ | 83/501 |
| 3,929,047 A | * | 12/1975 | Brandi | ................ | 493/60 |
| 4,026,176 A | * | 5/1977 | Weiskopf | ................ | 83/502 |
| 4,232,577 A | * | 11/1980 | Wallmann et al. | ................ | 83/482 |
| 4,257,299 A | * | 3/1981 | Aykut | ................ | 83/482 |
| 4,269,097 A | * | 5/1981 | Linn | ................ | 493/370 |
| 4,492,135 A | * | 1/1985 | Ginn et al. | ................ | 271/251 |
| 4,649,782 A | * | 3/1987 | Cavagna | ................ | 83/425.4 |
| 4,887,502 A | * | 12/1989 | Voges | ................ | 83/425.4 |
| 4,899,630 A | * | 2/1990 | Shioya et al. | ................ | 83/425.4 |
| 4,922,779 A | * | 5/1990 | Fritz et al. | ................ | 83/481 |
| 4,962,684 A | * | 10/1990 | Mowry | ................ | 493/370 |
| 5,048,388 A | * | 9/1991 | Kobayashi et al. | ................ | 83/495 |
| 5,135,178 A | * | 8/1992 | Strohmeyer | ................ | 241/236 |
| 5,138,921 A | * | 8/1992 | Winckler | ................ | 83/425.4 |
| 5,188,012 A | * | 2/1993 | Emich | ................ | 83/496 |
| 5,275,075 A | * | 1/1994 | Keech et al. | ................ | 493/342 |
| 5,735,184 A | * | 4/1998 | Miller et al. | ................ | 83/425.4 |
| 5,873,293 A | * | 2/1999 | Yamazaki | ................ | 83/497 |
| 5,992,279 A | * | 11/1999 | Hinz | ................ | 83/13 |
| 6,308,601 B1 | * | 10/2001 | Seyna et al. | ................ | 83/501 |
| 6,382,066 B1 | * | 5/2002 | Maier et al. | ................ | 83/499 |

* cited by examiner

Primary Examiner—Paul T. Sewell
Assistant Examiner—Nini F. Legesse

(57) ABSTRACT

Slitting shears comprising two knife shafts which are adjustable in relation to one another and are equipped with at least one knife each are described. Some of the knives are adjustable by means of compression springs and with compressed air in the opposite direction in parallel to the axis of the knife shaft. By correspondingly selecting the tensioning force, a machine tool is created which makes possible the automatic adjustment of the tools, especially knives and spring-loaded knives. Besides the reliable contact of the pairs of knives which is achieved as a result, the machine is made ready for operation in a simpler manner and more rapidly, especially in the case of a tool change.

1 Claim, 1 Drawing Sheet

SLITTING SHEARS

BACKGROUND OF THE INVENTION

The present invention pertains to slitting shears comprising two knife shafts, which are adjustable relative to one another and are equipped with at least one knife each.

Machines of this type are used to cut web material. Usual slitting shears contain a frame carrying two columns. The columns carry the mount of two adjustable knife shafts, which can be driven and carry at least one cooperating pair of knives for the cutting operation. One of the columns can be opened for setting and resetting the machine.

The problem arising in the machines is the impairment of the quality of cutting due to wear of the tools. The use of a spring-loaded knife, which shall come reliably into contact with the fixed counterknife because of its elastic properties, has become known for solving this problem. However, the adjustment of the spring-loaded knife has narrow limits, so that the above-mentioned problem will again arise in the case of greater wear on the fixed counterknife.

SUMMARY OF THE INVENTION

The basic object of the present invention is to provide shears of the above-mentioned type, with which a constant quality of cut can be guaranteed.

The object is accomplished according to the present invention with the features of claim 1.

Due to knives adjustable in the axial direction of the knife shafts, it is possible to hold the pairs of knives under constant contact pressure with corresponding force-applying means, so that a cutting or separation operation can be achieved with constant quality. The forces are applied for this purpose such that the adjustable knife is placed against the fixed knife of the pair of knives.

The movable knife can be brought into an opened position under the action of a force in the opposite direction, as a result of which the replacement of the tools can be facilitated and expedited.

According to one embodiment of the present invention, a hydraulic or preferably pneumatic force is provided for the movable knife or a knife holder holding the knife. The fluid system may be designed to apply forces in both directions, e.g., by overpressure and vacuum. The hydraulic system makes possible the fine coordination of the force acting on the knife and thus ensures the desired separation or cutting operation. Holes within the knife shaft may be used as guides for a pressurizing medium.

With corresponding selection of the tensioning force, a machine tool is thus created which makes possible the automatic adjustment of the tools, especially knives and spring-loaded knives. Besides the reliable contact of the pair of knives, which is achieved as a result, the machine is made ready for operation in a simpler manner and more rapidly, especially in the case of a tool change.

The use of a mechanical pressurizing means, e.g., a compression spring, for the opening direction of the knife and of a pressurizing medium, e.g., compressed air, as the force in the opposite direction represents a simple solution in terms of manufacturing technology.

The compression spring holds the movable knife holder in an opened position. After an operation and the switching off of the pressure of the medium, the machine can thus be opened immediately for resetting and the adjustment of the knife shaft can be performed without risks after the resetting.

The adjustment of the knife or knives is finally carried out automatically by introducing the pressure of the medium.

The embodiment according to the present invention can be used in all slitting shears and independently from the knives used. For example, spring-loaded knives which are arranged on a movable knife holder may be used for the movable knives.

According to another embodiment of the present invention, the knife shafts are equipped with two or more knives, and at least some of the knives and their knife holders are movable.

The knife shafts may be equipped with fixed and/or movable knives as desired. However, a design in which only one shaft is equipped with movable knives is advantageous, especially if a pressurizing medium is used as the pressurizing means.

In one variant, one knife shaft is equipped with fixed knives and knife holders and the other knife shaft with movable knives and knife holders.

According to another embodiment of the present invention, the knife shaft with the movable knives and knife holders also contains fixed knives. The expense is thus reduced without an appreciable impairment in the quality of separation. For example, the fixed knives of this shaft may be placed opposite the less worn fixed knives of the other shaft in this embodiment.

Embodiments in which the knife shaft for the movable knives or a set of tools on the knife shaft is axially displaceable are also conceivable. All knives are thus pressed with equal pressure to the corresponding counterknife, and the differences arising from differences in wear are compensated by the spring-loaded knives.

DESCRIPTION OF THE DRAWINGS

Exemplary embodiments of the present invention are schematically shown in the drawings, in which.

DESCRIPTION OF THE PREFERRED EMBODIMENTS

Figure 1:
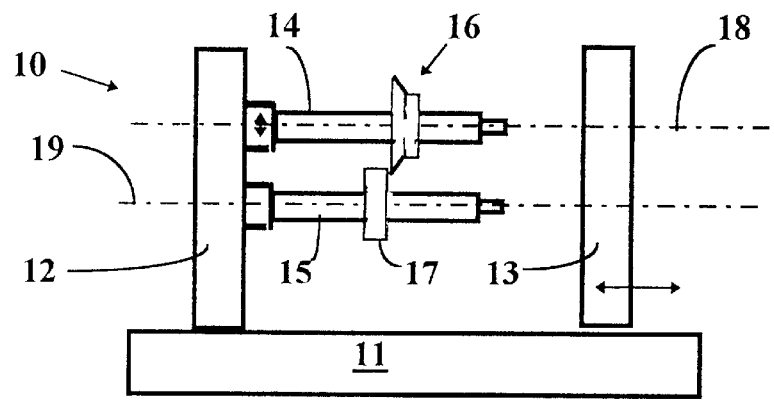
FIG. 1 shows a side view of slitting shears.

FIG. 1 shows slitting shears 10, which comprise essentially a frame 11, on which a fixed column 12 and a displaceable column 13 are mounted. Two drivable knife shafts 14 and 15 are mounted in the columns 12 and 13. The knife shafts 14, 15 are equipped with knives 16, 17 for the cutting operation after opening the displaceable or fold-up column 13. A pair of knives 16, 17 is shown in FIG. 1. Depending on the use, one or more pairs of knives 16, 17 are attached. The shaft axes are indicated by the reference numbers 18, 19.

Figure 2:
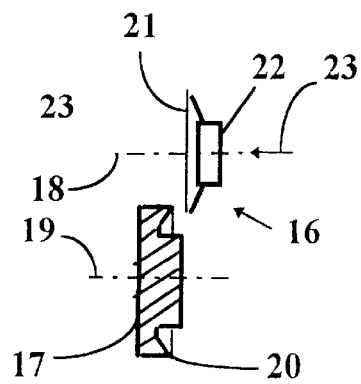
FIG. 2 shows a detail from FIG. 1.

FIG. 2 shows the pair of knives 16, 17 from FIG. 1 in greater detail. The knife 17 with the cutting edge 20 located on the knife shaft 15 is rigidly connected to the shaft 15. The knife 16 of the other knife shaft 14 comprises a spring-loaded knife 21 and a knife holder 22 holding same, which is made displaceable in the direction of the shaft axis 18.

After the adjustment of the movable knife shaft 14, the movable knife 16 is displaced by means of a force acting in the direction of arrow 23 such that the spring-loaded knife 21 with its cutting edge comes into contact with the cutting edge 20 of the fixed knife 17. Due to the sustained action of the force, the same tensioning force will always act on the cutting edges of the pair of knives, so that qualitatively uniform separation of the product to be cut is guaranteed.

To cut a plurality of webs, the knife shafts 14, 15 are usually equipped with a corresponding number of pairs of knives 16, 17. A compressive force is applied individually to each movable knife 16. One knife shaft, e.g., 14, is usually equipped with movable knives and the other knife shaft 15 with fixed knives.

If the manufacturing technical effort for the machine shall be kept low, fixed and movable knives, which correspondingly cooperate with fixed knives 17 of the other knife shaft 15, may be alternatingly provided on the knife shaft 14 equipped with movable knives. Spring-loaded knives are preferably used with the fixed knives of the first shaft 14 in this case.

Figure 3:
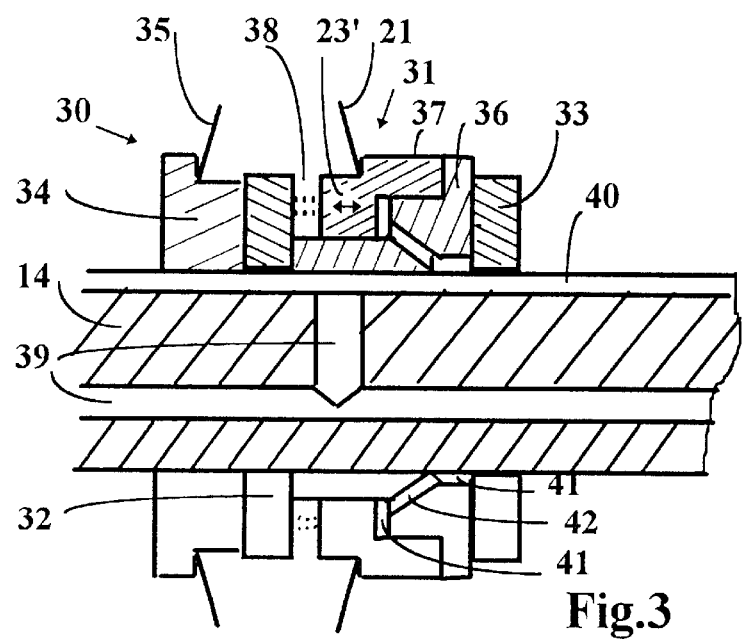
FIG. 3 shows an exemplary embodiment.

One example of this variant is shown in FIG. 3, in which the upper knife shaft 14 from FIG. 1 is shown with two knives in a longitudinal section. A fixed knife 30 is separated from the movable knife 31 by a spacer ring 32. On the other side, another spacer ring 33 separates the movable knife 31 from a second fixed knife, not shown, etc. The second knife shaft 15, not shown in FIG. 3, is equipped with a corresponding number of fixed knives, e.g., knives 17. The tools of both knife shafts are locked hydraulically.

The fixed knives 30 comprise a knife holder 34 each, which is anchored between spacer rings 32 and carries a spring-loaded knife 35. The movable knives 31 contain a knife holder 37 each, which is axially movable on a fixed base 36 in the direction of arrow 23'. A compression spring 38 acts on the knife holder 37 in the opening direction. The compression spring 38 or another mechanical pressing element or an elastic material holds the movable knife in its opened position.

After adjusting the knife shafts 14, 15, a tensioning force is applied to the movable knife holders 37 against the force of the spring 38. The spring-loaded knives 21 are now moved against the fixed knives 17 of the other knife shaft 15. If the tensioning force is selected correspondingly, a machine tool is created that makes possible the automatic adjustment of the tools, especially the knives and spring-loaded knives. Besides the simplification and the expedition of the setting up of the machine for use, which are achieved as a result, the knives remain in contact even during long-lasting cutting operations.

A channel system, which comprises an inner hole 39 and a longitudinal groove 40, is provided for the pressurizing medium in the knife shaft 14. The ring-shaped knife holders 34, the bases 36 and the spacers 32, 33, which are placed tightly next to one another, close the longitudinal grove 40 to form a channel which can be tapped as needed and can communicate with ring channels 41 and perforations 42 of the bases 36.

What is claimed is:

1. A slitting shear comprising a knife shaft, at least one fixed knife fixedly mounted on said knife shaft, at least one movable knife slidably mounted on said knife shaft for axial movement relative thereto, mechanical compression means mounted between said fixed knife and said movable knife for urging said movable knife in one axial direction, said knife shaft having a passageway in communication with said movable knife for enabling selective application of a fluid under pressure to force said movable knife to move, relative to said shaft, in an axial direction opposite said one axial direction, whereby the forces exerted by said fixed knife and said movable knife against respective knives mounted on another shaft can be independently adjusted.

* * * * *

UNITED STATES PATENT AND TRADEMARK OFFICE
CERTIFICATE OF CORRECTION

PATENT NO. : 6,631,664 B2
DATED : October 14, 2003
INVENTOR(S) : Muller

It is certified that error appears in the above-identified patent and that said Letters Patent is hereby corrected as shown below:

<u>Title page,</u>
After Item [76], insert:
-- [73]   Assignee:   Josef Frohling GmbH & Co.
                      KG Walzwerksmaschinenbau --

Signed and Sealed this

Seventeenth Day of February, 2004

JON W. DUDAS
*Acting Director of the United States Patent and Trademark Office*